Haigney & Hedman,
Clothes Pin,
No. 82,114. Patented Sept. 15, 1868.

Witnesses;
S. N. Piper
J. R. Snow

Inventors;
J. Haigney & F. M. Hedman
by their attorney
R. H. Eddy

United States Patent Office.

JOHN HAIGNEY AND FRANK M. HEDMAN, OF EAST BOSTON, MASSACHUSETTS.

Letters Patent No. 82,114, dated September 15, 1868.

IMPROVED CLOTHES-PIN.

The Schedule referred to in these Letters Patent and making part of the same.

TO ALL PERSONS TO WHOM THESE PRESENTS MAY COME:

Be it known that we, JOHN HAIGNEY and FRANK M. HEDMAN, of East Boston, in the county of Suffolk, and State of Massachusetts, have invented a new and useful Improvement in Clothes-Line Clamps; and do hereby declare the same to be fully described in the following specification, and represented in the accompanying drawings, of which—

Figure 1:
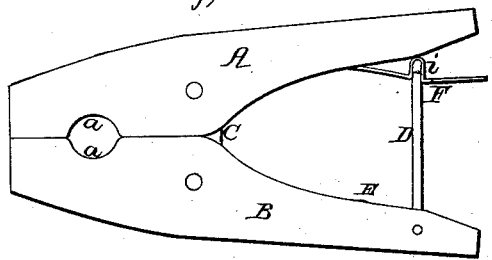

Figure 1 is a side view, and

Figure 2:
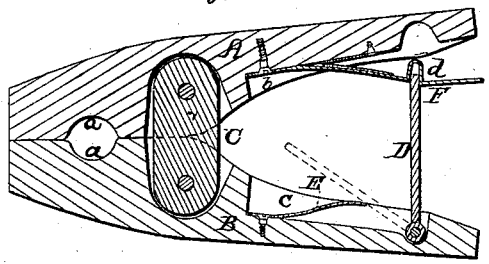

Figure 2 a longitudinal section of one of our improved clamps.

It is composed, in part, of two levers A B, formed and arranged as represented, and connected by a joint-link, C, which is pivoted to both of such levers. There is a notch, $a$, in the inner edge of the shorter arm of each lever. Furthermore, each of the other arms is recessed or chambered on its inner edge, as shown at $b$ and $c$. A brace or tongue, D, is arranged in one of the chambers, and at one end is hinged to the arm containing said chamber. Besides the brace, there is a spring, E, within the chamber, such spring being for the purpose of preventing the brace from being entirely forced into the chamber.

In the chamber of the opposite lever is a catch-spring, F, which is formed with a recess or notch, $d$, to receive the free end of the brace. At or near its inner end, the catch-spring is fastened to the lever in which it is placed, the whole being as represented in the drawings.

The brace and the catch-spring are for two purposes, viz, to lock the clamp upon an article of clothing and a line on which it may be hung, and to enable the two levers to accommodate themselves to the thickness of the line and article pinched between them.

By turning down the brace into the position denoted by dotted lines, the levers may be opened apart at their shorter arms. After they may have been closed upon an object, the brace should be thrown up into the notch of the catch-spring.

We claim as our invention—

The combination and arrangement of the brace D and the catch-spring F, with the two levers A B, connected together in manner and so as to operate substantially as described.

Also, the arrangement and combination of the auxiliary spring E, with the brace D, the catch-spring F and the two levers A B, arranged and combined substantially as explained.

JOHN HAIGNEY,
FRANK M. HEDMAN.

Witnesses:
R. H. EDDY,
F. P. HALE, Jr.